(12) United States Patent
Roberts

(10) Patent No.: US 9,777,493 B2
(45) Date of Patent: Oct. 3, 2017

(54) DRYWALL BRACE AND SYSTEM AND METHOD FOR ATTACHMENT OF FIXTURES TO DRYWALL USING THE SAME

(71) Applicant: James Bradley Roberts, San Tan Valley, AZ (US)

(72) Inventor: James Bradley Roberts, San Tan Valley, AZ (US)

( * ) Notice: Subject to any disclaimer, the term of this patent is extended or adjusted under 35 U.S.C. 154(b) by 0 days.

(21) Appl. No.: 15/230,267

(22) Filed: Aug. 5, 2016

(65) Prior Publication Data

US 2016/0341357 A1 Nov. 24, 2016

Related U.S. Application Data

(63) Continuation-in-part of application No. 14/059,473, filed on Oct. 22, 2013, now abandoned.

(51) Int. Cl.
| | | |
|---|---|---|
| *E04G 23/02* | (2006.01) | |
| *F16B 13/08* | (2006.01) | |
| *B32B 7/06* | (2006.01) | |

(52) U.S. Cl.
CPC ......... *E04G 23/0207* (2013.01); *E04G 23/02* (2013.01); *E04G 23/0203* (2013.01); *E04G 23/0214* (2013.01); *F16B 13/0808* (2013.01); *B32B 7/06* (2013.01)

(58) Field of Classification Search
CPC ......... G09F 3/10; B32B 7/06; E04G 23/0203; E04G 23/02; E04G 23/0207; E04G 23/0214; Y10T 428/14
See application file for complete search history.

(56) References Cited

U.S. PATENT DOCUMENTS

| | | | | |
|---|---|---|---|---|
| 3,583,122 A | | 6/1971 | Biegajski | |
| 3,605,547 A | * | 9/1971 | Millet | F16B 13/0808 29/432 |
| 3,999,347 A | | 12/1976 | Devlin | |
| 4,135,017 A | | 1/1979 | Hoffmann | |
| 4,285,183 A | * | 8/1981 | Condit | E04G 23/0203 52/514 |
| 4,297,823 A | * | 11/1981 | Keisler | E04G 23/0203 52/509 |
| 4,620,407 A | * | 11/1986 | Schmid | E04G 23/02 156/98 |
| 4,715,151 A | | 12/1987 | Garblik | |
| 5,007,223 A | * | 4/1991 | Holland | A47K 10/10 411/344 |

(Continued)

*Primary Examiner* — Andrew J Triggs
(74) *Attorney, Agent, or Firm* — Booth Udall Fuller, PLC

(57) ABSTRACT

A drywall brace and system or method for using the same can include a body including a length L, a width W, and a thickness T. The body can include a first surface defined by a first plane comprising the length L and width W, a second surface opposite the first surface, and a first end sharpened to a point adapted to form an opening through drywall. A mounting aperture can be formed completely through a central portion of the body and be sized to receive a threaded bolt for mounting a device. A first portion and second portion of flexible line can be coupled within 3 centimeters (cm) of the mounting aperture. An adhesive can be coupled to the first surface of the body and covered with a removable adhesive protective layer. A cleaning pad can be coupled to the second surface of the body.

12 Claims, 5 Drawing Sheets

(56) References Cited

U.S. PATENT DOCUMENTS

| | | | |
|---|---|---|---|
| 5,018,331 A | 5/1991 | Forzano | |
| 5,269,861 A | 12/1993 | Gilbreath | |
| 5,299,404 A | 4/1994 | Jabro | |
| 5,353,568 A | 10/1994 | Silva | |
| 6,378,263 B1 * | 4/2002 | Sobers | E04G 23/0203 52/443 |
| 6,594,967 B1 * | 7/2003 | Panahii | E04G 23/0203 156/71 |
| 7,540,122 B2 * | 6/2009 | Trudeau | B23D 71/02 52/514 |
| 7,730,691 B2 * | 6/2010 | Patrick | E04G 23/0203 52/366 |
| 8,615,949 B2 | 12/2013 | Georgievski | |
| 2003/0081865 A1 * | 5/2003 | Baker | B65D 33/1691 383/204 |
| 2006/0059829 A1 | 3/2006 | Flynn | |
| 2006/0101765 A1 * | 5/2006 | Bailey | E04G 23/0203 52/514 |
| 2011/0020577 A1 * | 1/2011 | Crossley | B65C 11/004 428/41.8 |

* cited by examiner

DRYWALL BRACE AND SYSTEM AND METHOD FOR ATTACHMENT OF FIXTURES TO DRYWALL USING THE SAME

RELATED APPLICATIONS

This application is a continuation in part of U.S. patent application Ser. No. 14/059,473, filed Oct. 22, 2013 titled "Drywall Brace and Method for Installing," the entirety of the disclosure of which is incorporated herein by this reference.

TECHNICAL FIELD

This disclosure relates to a system and method of bracing drywall and attachment of fixtures to the same.

BACKGROUND

Many structures in the United States and elsewhere, including residential and commercial structures, comprise interior walls formed of drywall or sheetrock. Small holes can be made in the drywall, such as by nails, screws, or picture holders (hereinafter "nails") to support the nails and hold the nails partially within the wall and partly extending from the wall to support, hold, or mount pictures, frames, or other decorations to the wall. In some instances, if an object placed on the nail, is too large or heavy, the nail can fail by being pulled from the wall, leaving an unsightly hole, and potentially causing the object resting on the nail to fall and be damaged.

In order to prevent the above-described nail failures, other devices have been introduced, including expansion bolts, toggle bolts, and plastic anchors, including L-clips and J-clips. FIG. 1 shows a cross-sectional profile view that includes examples of an expansion bolt 10, a toggle bolt 20, and plastic anchors 30, such as L-clip 32 and J-clips 34 mounted to, and partially disposed within, drywall or sheetrock 40.

SUMMARY

A need exists for a system and method for drywall bracing and fixture attachment. Accordingly, in an aspect, a drywall brace can comprise, a body comprising a length L, a width W, and a thickness T. The body can comprise a first surface being defined by a first plane comprising the length L and width W, a second surface opposite the first surface, and a first end sharpened to a point adapted to form an opening through drywall. A mounting aperture can be formed completely through a central portion of the body and extend from the first surface to the second surface, the mounting aperture sized to receive a threaded bolt for mounting a device to the drywall brace. A first portion of flexible line can be coupled within 3 centimeters (cm) of the mounting aperture. A second portion of flexible line can be coupled within 3 cm of the mounting aperture. An adhesive can be coupled to the first surface of the body and covered with a removable adhesive protective layer. A cleaning pad can be coupled to the second surface of the body.

The drywall brace can further comprise metal. The drywall brace length L can be greater than or equal to 30 cm, the width W can be in a range of 1-5 cm, and the thickness T can be greater than 0.95 cm. The width W of the drywall brace can be less than or equal to 2.54 cm. The drywall brace can further comprise a second end of the body formed opposite the first end, and a tang coupled to the second end of the body, the tang comprising a width Wt less than the width W of the body, and the tang being adapted to fit a power drill. The drywall brace can further comprise a first removable line and a second removable line each coupled to the removable adhesive protective layer and adapted to remove the adhesive protective layer from over the adhesive when a break-away tension is applied to the first removable line and the second removable line.

A method of securing the drywall brace to a piece of drywall can comprise rotating the drywall brace against the piece of drywall to drill a circular opening through the piece of drywall, rubbing the cleaning pad on the second surface of the drywall brace against a back surface of the drywall to dust the back surface the drywall, positioning the first surface of the drywall brace against the dusted back surface of the drywall, removing the removable adhesive protective layer to couple the drywall brace to the dusted back surface of the drywall with the mounting aperture aligned with the circular opening, and mounting a fixture to the drywall brace and piece of drywall by bolting the mounting fixture to the mounting aperture and through the circular opening, the drywall brace distributing weight of the mounting fixture across an area of the piece of drywall.

In another aspect, a drywall brace can comprise a body comprising a length L, a width W, and a thickness T, a first surface, and a second surface opposite the first surface. The drywall brace can also comprise a mounting aperture formed completely through the body and extending from the first surface to the second surface, a first portion of flexible line coupled within 3 cm of the mounting aperture, and a second portion of flexible line coupled within 3 cm of the mounting aperture. The drywall brace can further comprise the length L being greater than or equal to 30 cm, and the width W being in a range of 1-5 cm. The width W can also be less than or equal to 2.54 cm. The body can further comprise a first end sharpened to a point adapted to form an opening through drywall. The drywall brace can further comprise a second end of the body formed opposite the first end, and a tang coupled to the second end of the body, the tang comprising a width Wt less than the width W of the body, and the tang being adapted to fit a power drill. The drywall brace can further comprise an adhesive coupled to the first surface of the body and be covered with a removable adhesive protective layer disposed over the adhesive. The drywall brace can further comprise a first removable line and a second removable line each coupled to the removable adhesive protective layer and adapted to remove the adhesive protective layer from over the adhesive when a break-away tension is applied to the first removable line and the second removable line. The mounting aperture of the drywall brace can comprise a threaded mounting aperture.

In another aspect, a drywall brace can comprise a body comprising a first surface, and a second surface opposite the first surface. A mounting aperture can be formed completely through the body and extending from the first surface to the second surface. A first portion of flexible line can be coupled adjacent the mounting aperture. An adhesive can be coupled to the first surface of the body and covered with a removable adhesive protective layer.

The drywall brace can further comprise a first end sharpened to a point adapted to form an opening through drywall. The first portion of the flexible line can be coupled within 3 cm of the mounting aperture. The mounting aperture comprises a threaded mounting aperture. The mounting aperture can comprise a threaded nut disposed adjacent the mounting aperture to receive an fastener.

DETAILED DESCRIPTION

Figure 1:
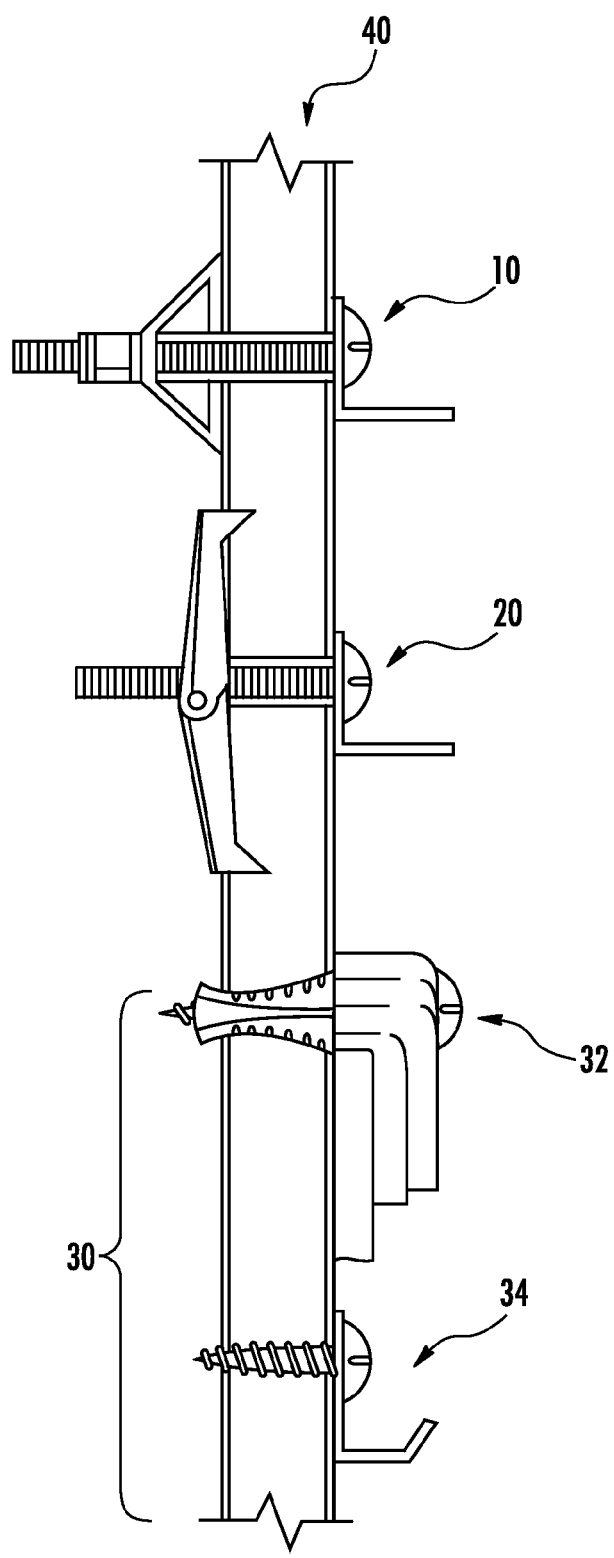
FIG. 1 shows a cross-sectional view of a number of drywall bolts and anchors as known in the prior art.

This disclosure, its aspects and implementations, are not limited to the specific material types, or other system component examples, or methods disclosed herein. Many additional components, construction and assembly procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Figure 2A:
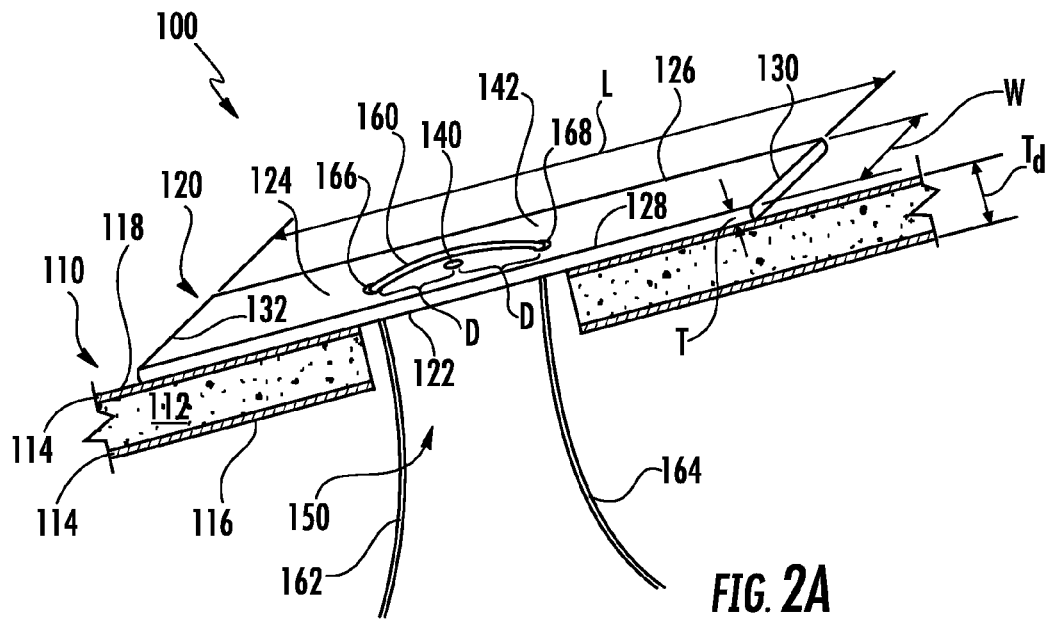
FIGS. 2A and 2B show perspective views of aspects of a drywall brace.

FIG. 2A shows a perspective view of a drywall brace 100 for mounting an object or fixture to a piece of drywall 110, or for patching a piece of the drywall 110. As used herein, drywall 110 can refer to one or more of drywall, wall board, gypsum board, sheet rock, plaster wall, lathe and plaster, stucco, or other similar material for walls, ceilings, or other similar structures. In some instances, drywall 110 can comprise an inner core 112 of gypsum, plaster, or other similar material and be bound at an outer surface by paper 114 or other sheathing material, including cellulose material or plastic. The drywall 110 can comprise a first surface or outer facing surface 116 that can be oriented towards a livable space, and be exposed to a room, and can optionally be covered with paint, texture, wallpaper, tile, carpet, or other suitable covering or decorative material. The drywall 110 can also comprise a second surface or inner facing surface 118 opposite the first surface 116 that can be oriented away from a livable space, and oriented towards an interior of a wall, attic, or other non-livable space. The drywall 110 can comprise any suitable thickness Td, such as a thickness of ½ inch (in.) (1.27 centimeters (cm), ⅝ in. (1.58 cm), or ¾ in. (1.905 cm).

The drywall brace 100 can comprise a body, base, or base bar 120 made of a metal, such as steel, stainless steel, galvanized steel, aluminum, copper, brass, or bronze, a wood, such an endogenous woods used in construction or exogenous woods such as bamboo, a plastic, including thermoplastic elastomers (TPE), Polyolefins; Polyethylene (PE), Polyethylene terephthalate (PETE), Polypropylene (PP), Polyetherimide (PET), and Polyethersulfone (PES), polyvinyl chloride (PVC), vinyl nitrile (VN), Melamine, Nylon, Acetal, Styrene Ethylene Butylene Styrene (SEBS), Isoprene Copolymers, Styrene, Polycarbonate, acrylonitrile butadiene styrene (ABS), polymethyl methacrylate (acrylic-glass or Plexiglas), or other similar material, as well as a ceramic, a fiber or fiber filled material, such as fiber glass or carbon fiber, or other suitable material.

The body 120 can comprise a length L, a width W, and a thickness T. The length L can be greater than or equal to 15 cm (6 in.), 30 cm (12 in.), or 45 cm (18 in.). The length L can also be about (within 0-10% or 0-5%) 15 cm (6 in.), 30 cm (12 in.), or 45 cm (18 in.). In some instances, a length of about 45 cm can be for wood framed structures in the United States (US), in that many wood framed structures can include spacing of about 18 inches between wood studs or rafters, which can allow the body 120 to be placed adjacent a back surface 118 of the drywall 110 between the studs, when the length L of the body 120 is perpendicular to a direction of the studs. In instances when the body 120 is parallel to the studs or rafters, the space available for the length L of the body 120 can be greater, such that the length L can be greater than or equal to 0.61 meters (m) (2 feet (ft.)), 0.91 m (3 ft.), or even in a range of 4-8 ft. (1.2-2.4 m).

The width W of the body 120 can be in a range of 1-5 cm (0.5-2.0 in.), or about (within 0-10% or 0-5%) 1.9 cm (0.75 in.) or 2.54 cm (1 in.). In some instance the width W can be up to about 10.2 cm (4 in.) or 15.2 cm (6 in.). The width W can often be less than 15.2 cm or 10.2 cm to accommodate use and movement of the body 120 within walls formed or framed with 2×6 or 2×4 studs. The thickness T of the body can be in a range of, or about (within 0-10% or 0-5%), 0.32-1.9 cm, (⅛-¾ in.), 0.97-1.9 cm (⅜-¾ in.), 1.27 cm (½ in.), or 1.6 cm (⅝ in.), and can vary based on a desired strength, rigidity, flexibility, or material type. In some instances, the thickness T can be about or substantially equal to a width W, such as with a width W of 1.9 cm (¾ in.) and a thickness T of 1.27 cm (½ in.), or with a cross sectional area (W×T) of about 2.4 $cm^2$ (0.38 $in.^2$). In yet other instances, such as when a fixture of less weight is being attached our mounted to drywall, the thickness T can be less, such as in a range of, or about (within 0-10% or 0-5%), 0.0-0.32 cm, (0-⅛ in.) and can be fashioned from sheet metal or other similar thin material.

The body 120 can comprise a first surface or front surface 122, which can be defined by a first plane comprising or substantially comprising the length L and width W. The body 120 can also comprise a second surface or back surface 124, opposite the first surface 122, the second surface 124 being defined by a plane, such as a second plane, that comprises or substantially comprises the length L and width W. The first surface 122 and the second surface 124 can share, and be separated or offset by, a first side 126, a second side 128, a first end 130, and a second end 132. The first side 126 can be opposite the second side 128, and the first end 130 can be opposite the second end 132.

A mounting aperture 140 can be formed completely through a central portion 142 of the body 120 and extend from the first surface 122 to the second surface 124, the mounting aperture 140 being sized to receive a threaded bolt for mounting a device or fixture to the drywall brace 100. The mounting aperture 140 can comprise a threaded sidewall for receiving a threaded bolt from the device or fixture to be mounted to the drywall brace 100. Alternatively, the mounting aperture 140 can comprise a smooth sidewall, and a nut can be placed opposite the device or fixture mounted to the body 120 or the drywall brace 100 to attach a threaded bolt from the device or fixture being mounted to the drywall brace 100. In some instances, a size or area of the central portion 142 of the body 120 can be approximately equal to a size or area of an opening 150 within the drywall 110 (such as a percent difference of the sizes being up to 10%, 25%, or 40%). As such, a size of the central portion 142 can comprise a size in a range of 1-16 $cm^2$.

One or more flexible lines 160 can also be coupled to the central portion 142 of the body 120, or near the mounting aperture 140, such as within 1-3 cm or the mounting aperture 140. The flexible line 160 can comprise string, twine, cord, single strand wire, multi-strand wire, filament, or other similar material. Portions of the flexible line 160 can be portions of the same flexible line, or can be different and distinct flexible lines. For example, the one or more flexible lines 160 can comprise a first line or a first portion of a single line 162 and a second line or a second portion of a single line 164. The flexible lines 160, 162, and 164 can be coupled to the body 120 to allow for a user to move an position the drywall brace 100 against the drywall 100, such as after being disposed through the opening 150 in the drywall 150, as described in greater detail with respect to FIGS. 3A-3C.

In some instances, the flexible lines 160, such as flexible portions 162 and 164 can extend from the first surface 122 to the second surface 124. As shown in FIG. 2A, the flexible line 160 can run continuously between the first line opening 166 and the second line opening 168 so that the flexible line can slide or be pulled through the openings to adjust a relative length of the line 160 extending through the first line opening 166 and the second line opening 168. The first line opening 166 and the second line opening 168 can be offset with respect to the mounting aperture 140 so that the flexible line 160 extending between first line opening 166 and the second line opening 168 does not intersect, cover, or interfere with the mounting aperture 140. In other instances, as shown in FIG. 2B, the first line 162 and the second line 164 can extend from the first surface 122 to the second surface 124 and terminate at or near the first line opening 166 and the second line opening 168, such as with knots or stoppers 167 and 169, respectively, at ends of 162 and 164 such that no line 160 extends between the first line opening 166 and the second line opening 168.

The flexible lines 160, 162, and 164 can be coupled to the central portion 142 of the body 120 at a distance D from the mounting aperture 140 (such as an edge of the mounting aperture 140) of less than or equal to 3 cm, 2 cm, or 1 cm. The flexible lines 160, 162, and 164 can be coupled, attached, or directly contact the first surface 122, the second surface 124, the first side 126, or the second side 128 of the body 120. In some instances, a distance (2D) between the first line opening 166 and the second line opening 168 can be twice the distance between the mounting aperture 140 and the first line opening 166 and the second line opening 168, respectively. In some instances, the distance 2D between the first line opening 166 and the second line opening 168 can be equal or substantially equal to the width W of the body 120, such as within percent difference of up to 10%, 25%, or 40%. As such, the distance between the first line opening 166 and the second line opening 168, and thus the first line 162 and the second line 164 when coupled to the body 120, can be in a range of 1-5 cm (0.5-2.0 in.), and in some instance can be up to about 10.2 cm (4 in.) or 15.2 cm (6 in.). When the distance between the first line opening 166 and the second line opening 168 is 1-5 cm, or more generally less than 3 cm, 2 cm, 1.27 cm, or about 1 cm, the flexible lines can provide good control and movement of the drywall brace 100 while keeping the opening 150 in the drywall 110 relatively small, a size or diameter of the opening 150 being substantially equal to a size of or width W of the body 120.

Figure 2B:
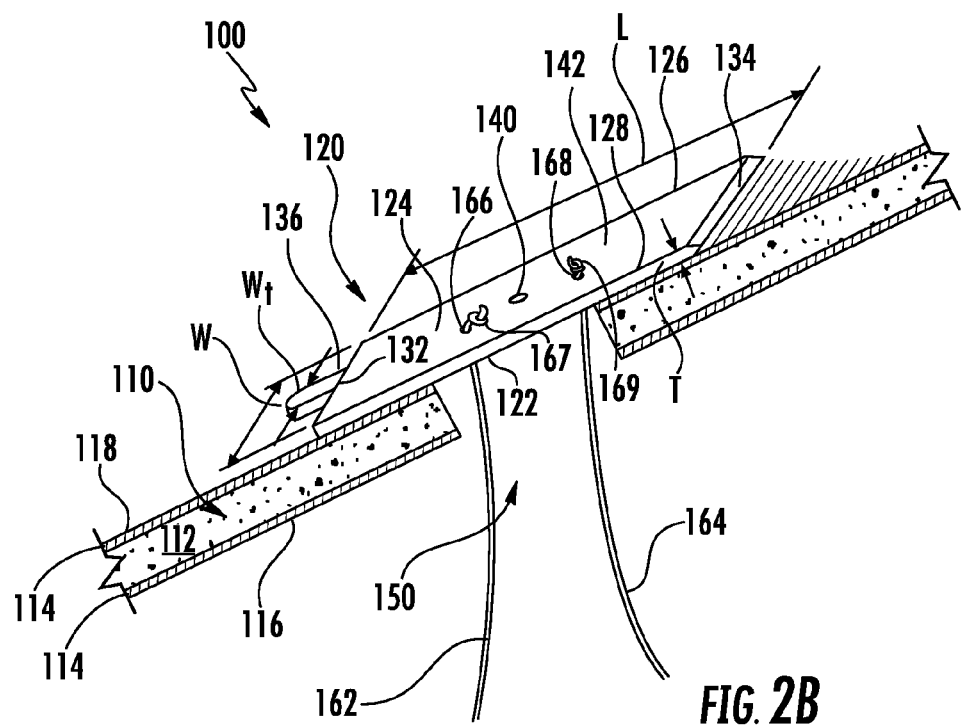

As shown in FIG. 2B, in some instances the first end 130 can be formed as a sharpened point, chisel point, or drill point 134, being adapted to form the opening 150 through the drywall 110. When the first end 130 is formed as a drill point 134, the second end 132 can also be formed as, or connected to, a tang 136 that is adapted, mateably sized, or configured to be received into a drill or chuck so that the body 120 can be, or operate as, a drill bit. A width of the tang Wt can be less than the width W of the body 120, and can comprise a width of 0-8 mm or 1-5 mm.

Figure 3A:
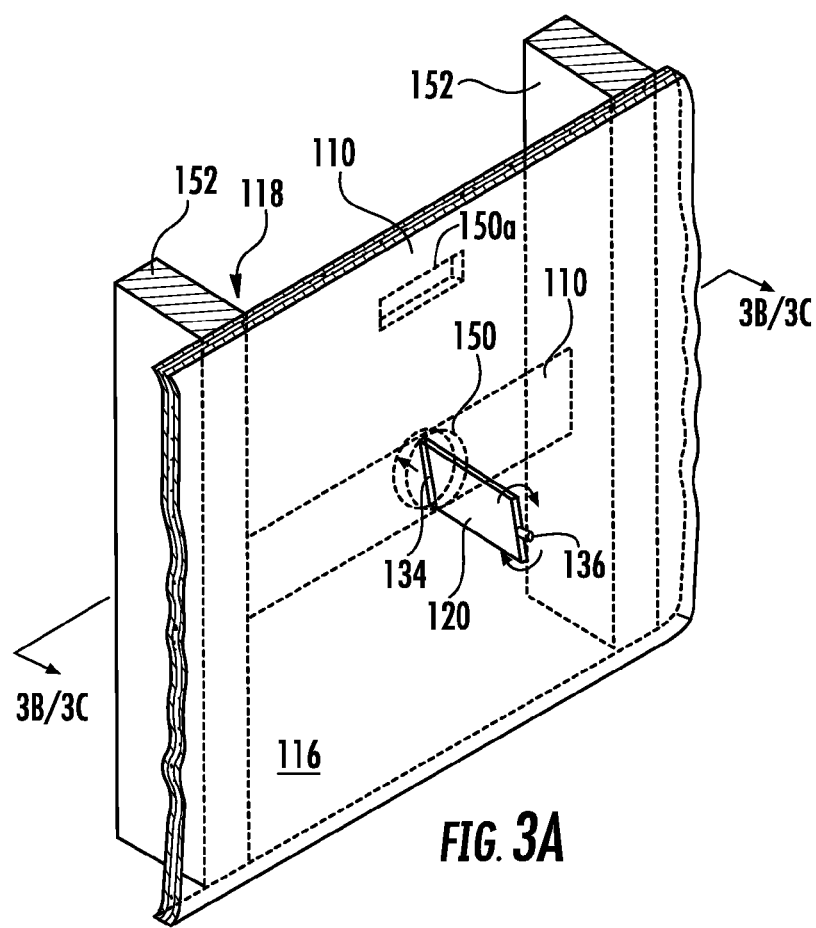
FIGS. 3A-3D show various views of drywall braces in use.

FIG. 3A shows a perspective view of the drywall 110 coupled or fastened to studs or framing 152, and the opening 150 in the drywall 110 disposed between, and offset from, the studs 152. FIG. 3A also shows an exemplary circular opening 150 being formed by the body 120 being rotated like a drill bit and the point 134 of the body 120 removing material from the drywall 110. However, in instances when the first end 130 of the body 120 does not comprise a sharpened point 134, the opening need not be formed by the body 120, and can be formed before the brace 100 is inserted through the drywall 110 from the front surface 116 to the back surface 118. FIG. 3a also shows an alternative opening 150a formed as a rectangle rather than a circle, through which the drywall brace 100 can be inserted. The dashed line in labeled 120 in FIG. 3A represents a perspective view of the drywall brace 110 positioned against the back surface 118 of the drywall 110, as shown in the cross-sectional view of FIG. 3D.

Figure 3D:
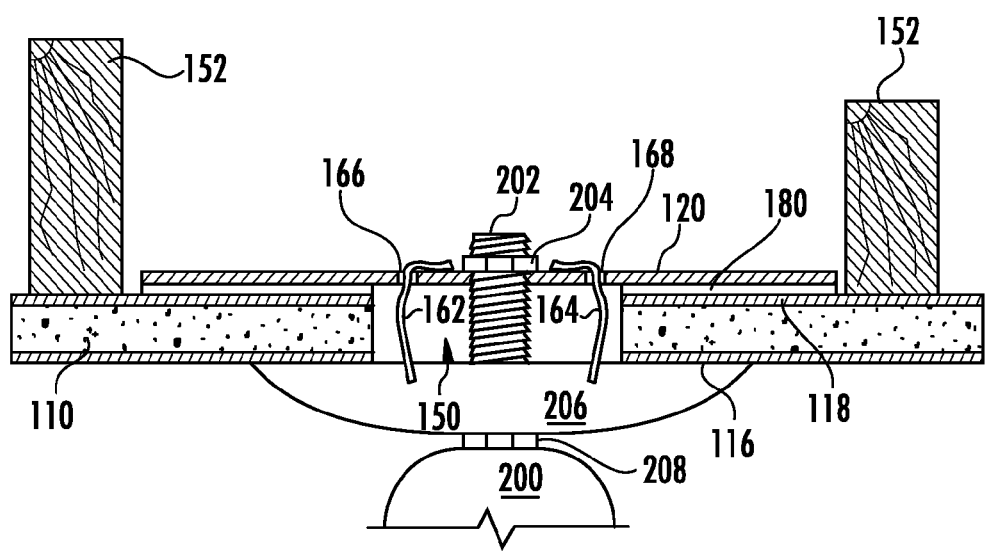
Figure 3C:
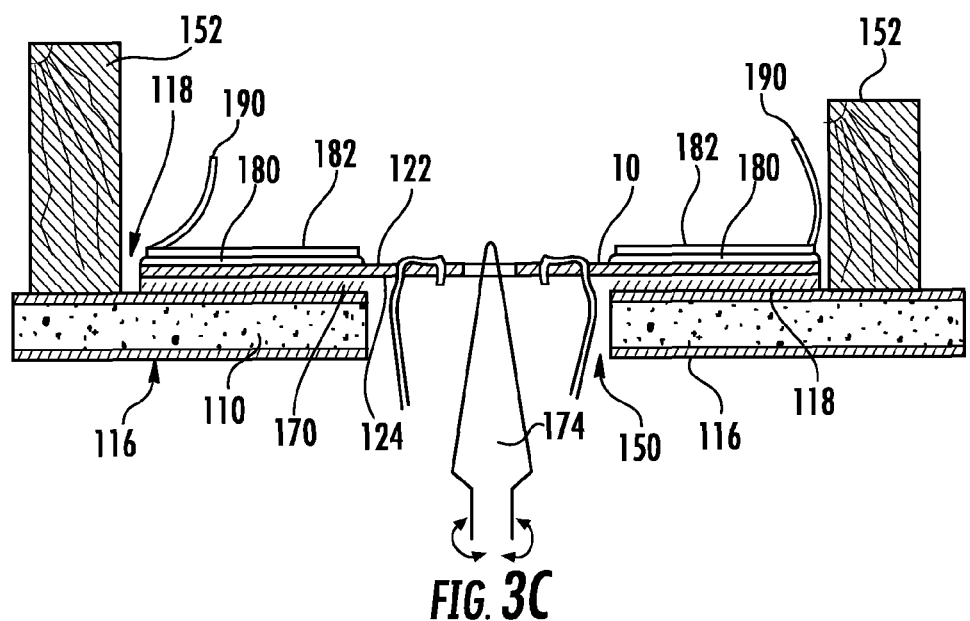
Figure 3B:
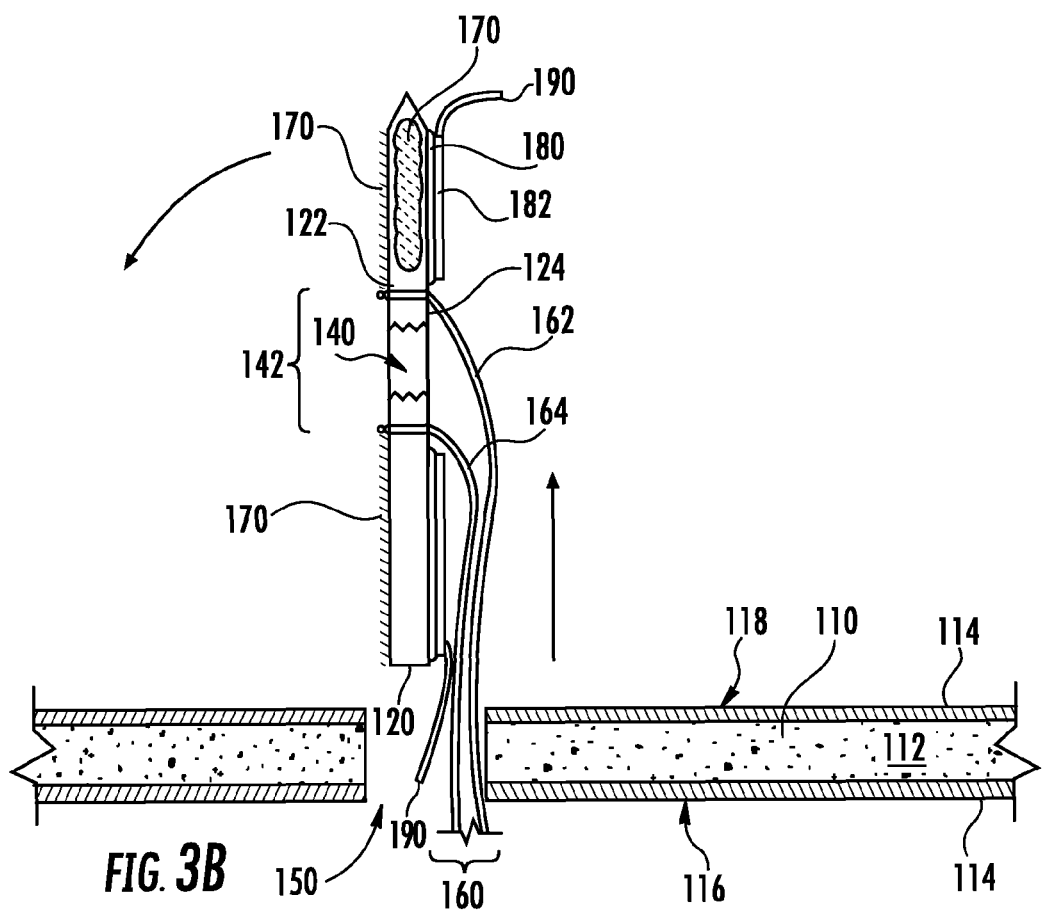

FIG. 3B shows a cross-sectional top view taken along the section-line 3B/3C shown in FIG. 3A. FIG. 3B further shows the drywall brace 110 having been inserted through the opening 150 in the drywall 110, with a portion of the flexible line 160 remaining outside the opening 150 to assist, or be used in, positioning the drywall brace 110 against the back surface 118 of the drywall 110.

FIG. 3B also provides additional detail for the feature of a cleaning pad, brush, dust mop, broom, rag, or textile material 170. The cleaning pad 170 can be coupled to the back surface 124 of the body 120, the first side 126, the second side 128, or other suitable surface of the body 120. By placing the cleaning pad 170 on the back surface 124, the cleaning pad does not interfere with mounting the first surface 122 of the drywall brace 110 to the back surface 118 of the drywall 110. Similarly, by placing the cleaning pad 170 on the back surface 124, the cleaning pad does not interfere with using the body 120 as a drill to form the opening 150 in the drywall 110. In other instances, the cleaning pad 170 can be coupled to the first side 126, the second side 128, and not be used as a drill so that the cleaning pad(s) 170 do not become dirty when being inserted through the opening 150.

FIG. 3B also provides additional detail for the feature of an adhesive or attachment layer 180. The adhesive 180 can comprise a glue, epoxy, adhesive, chemical bonding layer, construction adhesive, plaster, drywall mud, gel, liquid, hook and loop fasteners, mechanical protrusions, or other mechanical attachment feature. The adhesive 180 can be disposed on, or coupled to, the front surface 122 of the body 120, the first side 126, the second side 128, or other suitable surface, for coupling the drywall brace 100 to the back surface 118 of drywall 110. By placing the adhesive 180 on the front surface 122, the adhesive 180 does not interfere with using the body 120 as a drill to form the opening 150 in the drywall 110. In some instance the adhesive 180 can extend between, to cover completely or partially, an area of the first side 126 between the first end 130 and the second end 132, respectively, to the first line opening 166 and the second line opening 168 or to the central portion 142.

Additionally a cover, protective layer, or pull tab 182 can be disposed over, and cover, the adhesive 180 to protect the adhesive quality of the adhesive 180 and to prevent the adhesive 180 from being scrapped off or damaged when being handled, or installing the drywall brace 110 such as passing the drywall brace through the opening 150 or the rectangular opening 150a. The cover 182 can be removed from the adhesive 180 when the adhesive 180 is disposed adjacent, or is to be attached to a desired surface, like the back surface 118 of the drywall 110. The cover 182 can be removed by pulling the cover 182 with a force greater than or equal to a break-away force or break-away tension. In some instances, the cover 182 will be pulled in a direction from the first end 130 and the second end 132, respectively, toward the central portion 142. In some instances, the cover 182 can comprise one or more removable lines 190, such as a first removable line 192 and a second removable line 194 each being coupled to the removable adhesive protective layer 182 and adapted to remove the adhesive protective layer 182 from over the adhesive layer 180 when a break-away tension is applied to the first removable line 192 and the second removable line 194. The removable lines 190, 192, and 194 can comprise string, twine, cord, single strand wire, multi-strand wire, filament, or other suitable material. In some instances, the break-way tension can be equal, or substantially equal (e.g., within 0-20%, 0-10%, or 0-5%), to a force of 5 lbs, 10 lbs, 15 lbs, or 0-20 lbs.

FIG. 3C shows a cross-sectional top view taken along the section-line 3B/3C shown in FIG. 3A, FIG. 3C showing a cross-sectional top view of the drywall brace 110 positioned against the back surface 118 of the drywall 110 between studs 152. The drywall brace 100 is positioned with the second surface 124 and the cleaning pad 170 oriented towards, and in contact with, the back surface 118 of drywall 110. A pair of pliers, needle nose pliers, or other suitable tool 174 can be inserted through the opening 150 to grasp the drywall brace 100 and move or rotate the drywall brace so that the cleaning pad 170 can clean the back surface 118 of the drywall 110. In some instances, the cleaning pad 170 can act as a dust mop and clean the back surface 118 of the drywall 110 by being wiped back and forth. The back surface can be cleaned of dust, debris, powder, or other material, either existing or created by the opening or formation of opening 150, that would undesirably or adversely impact the adhesion of the adhesive 180 to the back surface 118.

FIG. 3D shows that after the back surface 118 is cleaned, such as with the cleaning pad 170 or in another suitable way, the drywall brace 110 can be positioned with the front surface 116 oriented towards the back surface 118. In some instances, the drywall brace 110 can be turned, rotated, or flipped with the flexible line 160, such as with the first line 162 and the second line 164. The flexible line 162 can be used to reverse an orientation of the drywall brace 110 so that the front surface 122 is oriented towards the back surface 118 of the drywall 110, or is oriented in a same direction as the front surface 116 of the drywall 110. As such, the flexible line 160 and its position or attachment to the body 120 can allow for the drywall brace 110 or a large size to be maneuvered and positioned behind the drywall 110 through the small opening 150 in the drywall 110.

When present, the adhesive 180 can also be oriented toward the back surface 118 and be placed in direct contact with the back surface 118 so that the adhesive 180 holds the drywall brace 110 to the drywall 110. When the cover 182 is used, the cover can be removed or peeled off by pulling the removable line 190, such as the first removable line 192 and the second removable line 194, to remove the cover 182 from between the adhesive 180 and the back surface 118 so that the adhesive 180 contacts the back surface 118 to hold the drywall brace 100 to the drywall 110 at a desired location where the mounting aperture is exposed through the opening 150 for the mounting of a fixture 200 against the drywall 110 with the drywall brace 100. The fixture 200 can be a chandelier, light fixture, wall sconce, frame, picture, sculpture, piece of artwork, decoration, shelf, chattel, or other similar object.

FIG. 3D also shows the fixture 200 can be coupled or releasably coupled to the drywall brace 100 with one or more fasteners 202. Fasteners 202 can be bolts, screws, clips, hooks, or other suitable attachment device made of one or more materials that can be the same as, or different than, the material used for the body 120. In some instances, the fastener 202 can be a bolt that is coupled to the base 120 by a threaded mounting aperture 140. In other instances, the fastener 202 can be coupled to the base 120 by one or more nuts or washers 204, the nut 204 being coupled, attached, or embedded at the back surface 124 of the body 120, opposite the adhesive 180, and aligned with the mounting aperture 140. In other instances, electrical wires and electrical connections can also pass through opening 150, mounting aperture 140, or through other similar connection openings formed through the body 120.

The fixture 200 can also be coupled to the fastener 202, the drywall brace 100, and the body 120 through the fastener 202. A cover plate, fixture flange, or fixture cover 206 can be made of one or more materials that are the same or different than the material of the body 120. The cover plate or fixture flange 206 can be separate from, part of, or integrally formed with, the fixture 200. The fixture flange 206 can be disposed between the outer surface 116 of the drywall 110 and the fixture 200, and completely cover or the opening 150 in the drywall 110 to conveniently and completely cover from view the opening 150 used for inserting the drywall brace 100 behind the drywall 110, such as within a wall or above a ceiling. In some instances the cover plate can be secured to the fastener 202 with a nut, collar, or bushing 208, such as by having the nut 208 sandwiching the cover plate 206 between the drywall 110 and the nut 208. In other instances, the cover plate 206 can be attached in any other desirable way so as to cover the opening 150.

In any event, using the drywall device 100 for the mounting of the fixture 200 can provide improved support for heavy or bulky fixtures 200. The large amount of support and mounting capability provided by the drywall device 100 can be supplied with an installation requiring only a small opening 150, thereby eliminating a need for patching, painting, or other repair work. Eliminating patching, painting, and repair work can make the installation of the drywall brace 100 faster and less expensive than alternative repairs known in the art. Additionally, by being robust, use of the drywall device 100 can eliminate a problem of supporting heavy fixtures 200 with conventional anchors that are inadequate to support the weight of the fixtures. For example, screw anchors can be over-torqued, rendering them useless, and having been removed, an unsightly and unusable hole, such as a hole of ⅝ or ¾ inches, can remain after removal of the screw anchors. The holes left by the screw anchors can be unusable by conventional methods or devices because screw anchors with a diameter larger than ¾ in. can be unsupportable by the drywall. Additionally, a hole patched with drywall mud, plaster, or spackle can have less strength than native or original drywall 110, and can lack structural support for receiving and holding new anchors.

Use of the drywall brace 110 can allow otherwise blighted, unsightly, and holes unusable for mounting to be salvaged and for an opportunity to mount fixtures 200 at the locations of the holes, and through the holes, without the added work of patching, and without additional screws and screw holes away from the original hole, occasioned by conventional drywall patching with a furring piece placed behind the hole and the drywall. A need to remove and replace a large section of drywall is also eliminated. Instead, the drywall brace 100 can be flexed, curved, or bent, to fit into small cavities, such as opening 150, to be positioned within a dead space or gap of about 4 in. such as between conventional walls, the drywall brace still being long enough to provide a large reinforcement area behind the drywall 110, to be robust, support and distribute weight of the fixture 200. In some instance, a small amount of patching can occur to fill-in the opening 150 after the drywall brace 100 has been secured to the drywall 110 and before or after the fixture 200 has been coupled to the drywall brace 100. As such, the drywall brace 100 can also facilitate or serve as a drywall-patching device, with low invasiveness or impact on the in-situ drywall and with significant structural strength.

In some instances, the brace 100 can fit through a hole with a diameter no larger than 2.54 cm (1.0 in.), 1.9 cm (¾ in.), or 1.27 cm (½ in.) and can comprise a length L of 40-50 cm (16-20 in.) to support a weight of 34 kg (75 lbs). For example, in testing, a brace 10 comprising a length L of 46 cm (18"), a width W of 1.9 cm (¾ in.) and a thickness T of 1.27 cm (½ in.) positioned on ½ in. drywall and fastened to joists spaced at 24 inches with ½ in. drywall screws supported a weight of 34 kg (75 lbs.). In some instances, such as to support greater weights, the drywall brace 100 can be really long and comprise a length L in a range of 4-8 feet, the drywall brace 100 being disposed, or running parallel to ceiling joists, trusses, or studs 152. Alternatively, and in other instances, the length L of the drywall brace 100 can be shorter or of a smaller length L, and be oriented or disposed in a direction that is perpendicular to the trusses, joists, or studs 152, such as is shown in FIG. 3A, so that the ends 130, 132 of the body 120 can be next to, abut, or contact the studs 152 or a portion of the drywall 110 coupled or attached to the joist or stud 152. In yet other instances, the drywall brace 100 may not be perpendicular or parallel with the studs 150, but will instead be angled or skewed, and can still contact or be adjacent to the joist or stud 152. As such, the drywall brace 100 can comprise strength for mounting of the fixture 200 similar to a strength provided by mounting the fixture directly to a stud 152, but by not needing to be directly mounted to the stud, and using the drywall brace 100 mounting of the fixture 200 can be done with more flexibility in placement of the fixture 200, the position of the fixture 200 not being tied to a position of a stud 152, that might occur only every 18 in. along a wall or ceiling.

Figure 4:
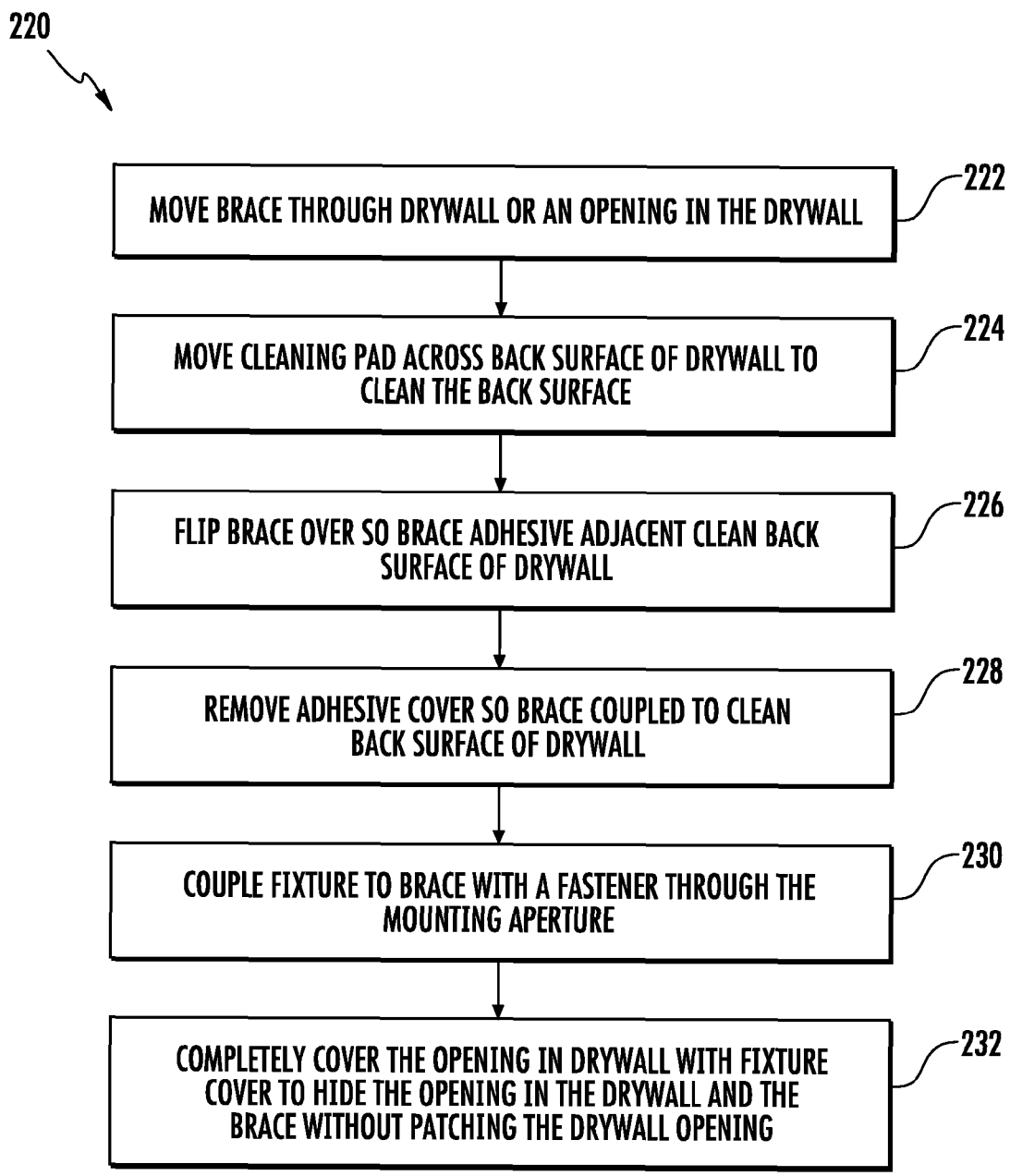
FIG. 4 shows a flowchart for a method of using a drywall brace.

FIG. 4 shows a flow chart 220 or a method of securing the drywall brace 100 to a piece of drywall 110 comprising the actions shown in boxes 222-232. At box 222, the drywall brace 100 can be moved through drywall 110 or through the opening 150 in the drywall 110. The drywall brace 100 can be moved through the drywall 110 by rotating the drywall brace 100 against the piece of drywall 110 to drill a circular opening through the piece of drywall. At box 224, the cleaning pad 170 can be moved or rubbed across the back surface side 118 of the drywall 110 to clean the back surface 118. At box 226, the brace 110 can be flipped over or positioned so that the first surface 122 of the brace 100 comprising the adhesive 180 is adjacent or against a clean back surface 118 of the drywall 110. At box 228, the adhesive cover 182 can be removed from over the adhesive 180 so that the brace 100 can be coupled to clean back surface 118 of the drywall 110, so that the mounting aperture 140 fixedly aligned with the circular opening 150. At box 230, the fixture 200 can be coupled to the brace 100 with the fastener 202 disposed through the mounting aperture 140. At box 232, the opening 150 in drywall 110 can be completely covered with fixture cover 206 to hide the opening 150 in the drywall 110 and the brace 100 without patching the opening 150 in the drywall 110. In some instances, the fixture cover 206 can hide the opening 150 when the fixture 200 is fastened with fastener 202 to the mounting aperture 140 through the opening 150, the drywall brace 100 distributing weight of the mounting fixture 200 across an area of the drywall 110.

Where the above examples, embodiments, and implementations reference examples, it should be understood by those of ordinary skill in the art that other systems, devices, and examples could be intermixed or substituted with those provided. In places where the description above refers to particular embodiments, it should be readily apparent that a number of modifications may be made without departing from the spirit thereof and that these embodiments and implementations may be applied to other technologies as well. Accordingly, although particular component examples may be disclosed, such components may be comprised of any shape, size, style, type, model, version, class, grade, measurement, concentration, material, weight, quantity, and/or the like consistent with the intended purpose, method and/or system of implementation. Thus, the presently disclosed aspects and embodiments are, therefore, to be considered in all respects as illustrative and not restrictive. The disclosed subject matter is intended to embrace all such alterations, modifications, and variations that fall within the spirit and scope of the disclosure and the knowledge of one of ordinary skill in the art, as set forth in the claims.

What is claimed is:

1. A drywall brace, comprising:
   a body comprising:
   a length L greater than or equal to 30 centimeters (cm),
   a width W in a range of 1-5 cm,
   a first surface being defined by a first plane comprising the length L and width W,
   a second surface opposite the first surface,
   a first end sharpened to a point adapted to form an opening through drywall,
   a second end of the body formed opposite the first end, and
   a tang coupled to the second end of the body, the tang comprising a width Wt less than the width W of the body, and the tang being adapted to fit a power drill;
   a mounting aperture formed completely through a central portion of the body and extending from the first surface to the second surface, the mounting aperture sized to receive a threaded bolt for mounting a device to the drywall brace;
a first portion of flexible line coupled within 3 centimeters (cm) of the mounting aperture;
a second portion of flexible line coupled within 3 cm of the mounting aperture;
an adhesive coupled to the first surface of the body and covered with a removable adhesive protective layer; and
a cleaning pad coupled to the second surface of the body.

2. The drywall brace of claim 1, wherein the body comprises metal.

3. The drywall brace of claim 1, wherein the width W is less than or equal to 2.54 cm.

4. The drywall brace of claim 1, further comprising a first removable line and a second removable line each coupled to the removable adhesive protective layer and adapted to remove the adhesive protective layer from over the adhesive when a break-away tension is applied to the first removable line and the second removable line.

5. A method of securing the drywall brace of claim 1 to a piece of drywall comprising:
rotating the drywall brace against the piece of drywall to drill a circular opening through the piece of drywall;
rubbing the cleaning pad on the second surface of the drywall brace against a back surface of the drywall to dust the back surface the drywall;
positioning the first surface of the drywall brace against the dusted back surface of the drywall;
removing the removable adhesive protective layer to couple the drywall brace to the dusted back surface of the drywall with the mounting aperture aligned with the circular opening; and
mounting a fixture to the drywall brace and piece of drywall by bolting the mounting fixture to the mounting aperture and through the circular opening, the drywall brace distributing weight of the mounting fixture across an area of the piece of drywall.

6. A drywall brace, comprising:
a body comprising:
a length L greater than or equal to 45 centimeters (cm),
a width W in a range of 1-5 cm,
a first surface, and
a second surface opposite the first surface;
a mounting aperture formed completely through the body and extending from the first surface to the second surface;
a first portion of flexible line coupled within 3 centimeters (cm) of the mounting aperture; and
a second portion of flexible line coupled within 3 cm of the mounting aperture.

7. The drywall brace of claim 6, wherein the width W is less than or equal to 2.54 cm.

8. The drywall brace of claim 6, wherein the body further comprises a first end sharpened to a point adapted to form an opening through drywall.

9. The drywall brace of claim 8, further comprising:
a second end of the body formed opposite the first end; and
a tang coupled to the second end of the body, the tang comprising a width Wt less than the width W of the body, and the tang being adapted to fit a power drill.

10. The drywall brace of claim 6, further comprising an adhesive coupled to the first surface of the body and covered with a removable adhesive protective layer disposed over the adhesive.

11. The drywall brace of claim 10, further comprising a first removable line and a second removable line each coupled to the removable adhesive protective layer and adapted to remove the adhesive protective layer from over the adhesive when a break-away tension is applied to the first removable line and the second removable line.

12. The drywall brace of claim 6, wherein the mounting aperture comprises a threaded mounting aperture.

* * * * *